(12) United States Patent
Ohazama et al.

(10) Patent No.: US 7,225,207 B1
(45) Date of Patent: May 29, 2007

(54) SERVER FOR GEOSPATIALLY ORGANIZED FLAT FILE DATA

(75) Inventors: Chikai J Ohazama, Sunnyvale, CA (US); Phillip C Keslin, San Jose, CA (US); Mark A Aubin, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 632 days.

(21) Appl. No.: 10/270,272

(22) Filed: Oct. 10, 2002

Related U.S. Application Data

(60) Provisional application No. 60/328,487, filed on Oct. 10, 2001.

(51) Int. Cl.
*G06F 17/30* (2006.01)

(52) U.S. Cl. .................... 707/203; 707/104.1

(58) Field of Classification Search ............... 707/1–10, 707/100–104.1, 200–205; 709/203; 701/213
See application file for complete search history.

(56) References Cited

U.S. PATENT DOCUMENTS 6,901,428 B1 * 5/2005 Frazier et al. ............... 709/203
2003/0069693 A1 * 4/2003 Snapp et al. ................ 701/213

* cited by examiner

*Primary Examiner*—Mohammad Ali
(74) *Attorney, Agent, or Firm*—Fenwick & West LLP

(57) ABSTRACT

A flat file data organization technique is used for storing and retrieving geospatially organized data. The invention reduces transfer time by transferring a few large files in lieu of a large number of small files. It also moves the process of locating a given data file away from the file system to a proprietary code base. Additionally, the invention simplifies database management by having quadtree packets generated on demand.

6 Claims, 13 Drawing Sheets

Legend

- Datapacket

- QuadTreeIndexNode

- QuadTreeFilePosition

- QuadTreePosition

- QuadTreeFileEntry

- QuadTreeFileList

- QuadTreeIndexSection

- QuadTreeQuantum

- QuadTreePacket

BaseTree

SubTree

SERVER FOR GEOSPATIALLY ORGANIZED FLAT FILE DATA

CROSS-REFERENCE TO RELATED APPLICATION

This application claims priority from U.S. provisional patent application Ser. No. 60/328,487 for "Server For Geospatially Organized Flat File Data," filed Oct. 10, 2001, the disclosure of which is incorporated herein by reference.

BACKGROUND OF THE INVENTION

1. Field of the Invention

The present invention is related to organization and processing of flat file data, and more particularly to systems, methods, and computer program products for delivering content from several flat file databases that can reside locally and/or remotely.

2. Description of the Background Art

Conventionally, stored data on a server is organized according to a plurality of files in a file system. In an application for storing, retrieving, and drawing geospatially organized data (such as an interactive viewer for geospatial data), each node may use a separate file for each drawable, with the various files being organized in a hierarchy of directories. Data representing imagery can be stored in basically the same way, possibly with different directory hierarchy and file naming protocols (for example, the clipgen format). Quadtree packets, which are the data files that are sent to the client that describe the quadtree structure and contents of the database, are computed beforehand and stored as files on the server. If a large amount of data is to be managed, creation and storage of such a database can overload a conventional file system. In order to mitigate the strain on the file system, a special output format may be employed to transfer the files. Even with such an arrangement, large amounts of data can result in corruption of the file system.

SUMMARY OF THE INVENTION

In order to avoid the excessive transfer time and inefficiency of using a conventional file system, the present invention employs a flat file data organization technique, referred to herein as "Keyhole Flatfile," or KFF, for storing and retrieving geospatially organized data. KFF reduces transfer time by transferring a few large files in lieu of a large number of small files. It also moves the process of locating a given data file away from the file system to a proprietary code base. Finally, KFF makes database management much easier by having the quadtree packets generated on demand. Items can be added to the database by simply inserting the files rather than inserting and regenerating the appropriate quadtree packets. Keyhole Flatfile assumes very low cache coherency, to account for the fact that in an application such as a geospatial data viewer, users might be looking at multiple different places on the globe, so that requests are likely to hit disparate parts of database and not just one location. Given this scenario, it is beneficial to minimize disk seeks. The indexing system of Keyhole Flatfile is a quadtree-based structure, wherein each node points to a location in a binary file that contains the data files.

In practice, the Keyhole Flatfile system has actually benefited significantly from the caching of the file system. Since it was designed for the worst-case scenario, it performs better than expected during normal access to the server. A memory caching system may be employed in conjunction with Keyhole Flatfile, if desired. Performance may be further improved by adding more memory to the server.

Keyhole Flatfiles may be accessed directly over the Internet by applications such as Earthviewer 3D and Earthviewer PocketPC. Earthviewer HTML viewer accesses the data directly on the server and delivers the rendered image to the web browser.

The present invention uses a quadtree index not only to help find data objects within a massive database, but also for fast delivery of the quadtree index itself to a remote application. This is accomplished by a four-level sectioning of the quadtree index, which allows for the quadtree packets to be generated with a minimal amount of reads from disk. The invention further provides the ability to quickly merge quadtree packets on the fly, thus allowing delivery of multiple databases without requiring that they be preprocessed into one database. Such functionality has benefits in the management of the database and for rapid deployment of new data.

DETAILED DESCRIPTION OF THE PREFERRED EMBODIMENTS

Definitions

EarthServer DataStream—A server employing the techniques of the present invention.

Earthviewer 3D—A client application for viewing data provided via EarthServer DataStream.

Earthviewer PocketPC—A client application for viewing data provided via EarthServer DataStream.

Earthviewer HTML—An HTML-based viewer for viewing data provided via EarthServer DataStream.

Keyhole Binary File (KBF)—A file containing drawable packets that are concatenated one after another with a header describing where it should go in the database attached to the front of each packet.

Keyhole Flat File (KFF)—A file containing a set of data packets that are spatially indexed. It is the primary data format for EarthServer DataStream.

Raw Flat File (FF)—A file containing imagery or terrain tiles that are concatenated one after another with a header describing where it should go in the database attached to the front of each tile.

dbRoot—A file containing the version and channel information of a given KFFDB. It is used in deployment of a KFFDB to the EarthViewer 3D client.

QuadTree Packet—The QuadTree packet contains a set of nodes organized in recursive order describing the contents of the database at those specific nodes. This is the data packet that is sent to the EarthViewer 3D client to tell it what is contained in the KFFDB database.

Drawable Packet—This packet contains a set of drawables that can include, etSite (labeled points), etStreet (labled lines for drawing streets), and etPolyLines (multi-point line). These packets are associated with a particular node in the QuadTree and are sent to the client in order to draw such things as roads, points of interest, and state borders.

Image Tile—This is a one section of imagery at a particular resolution and position (i.e. a particular point in the QuadTree).

Terrain Tile—This is a one section of the terrain at a particular resolution and position (i.e. a particular point in the QuadTree).

System Architecture

Figure 7:
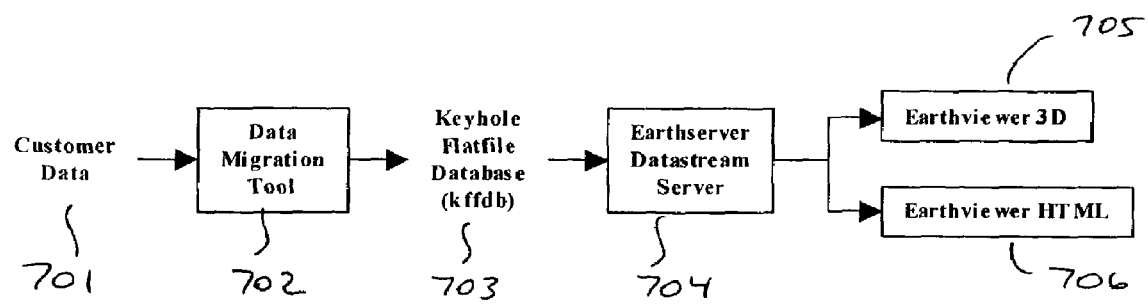
FIG. 7 is a flow chart of the basic system flow according to one embodiment of the present invention.

Referring now to FIG. 7, the basic flow of the EarthServer DataStream product consists of first taking the customer's data 701 and converting it via a data migration tool 702 into a Keyhole Flatfile Database (KFFDB) 703. This KFFDB is then transferred over to EarthServer DataStream server 704 and its contents are then delivered to the Earthviewer products (such as Earthviewer 3D 705 and/or Earthviewer HTML 706) over the Internet.

Data Migration

Figure 6:
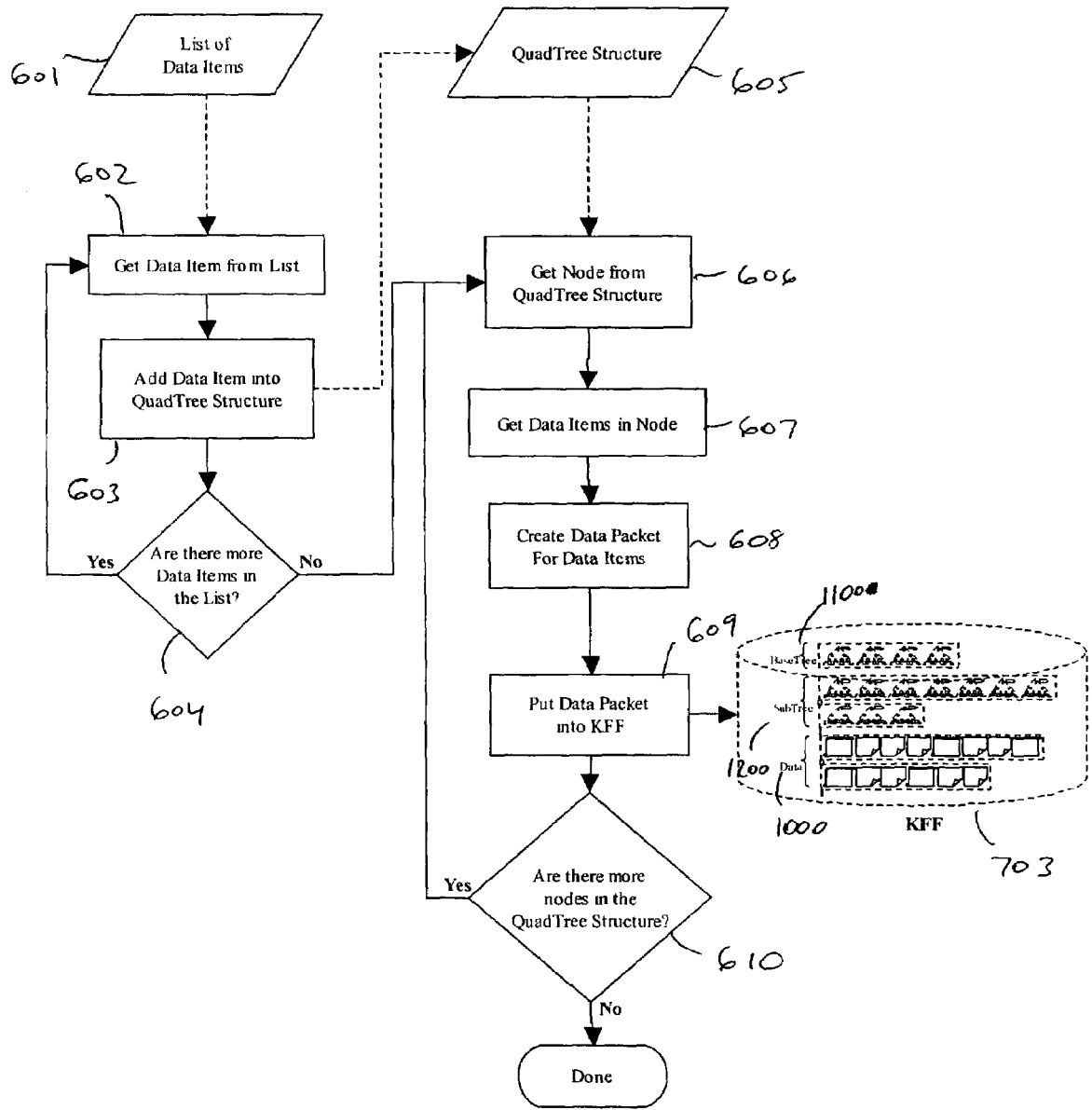
FIG. 6 is a flow chart of general data migration according to one embodiment of the present invention.

Referring now to FIG. 6, there is shown a flowchart of data migration as performed by data migration tool 702 according to one embodiment of the present invention. Tool 702 gets 602 a data item from list 601 of data items, and adds 603 the data item to QuadTree structure 605. If, in 604, there are more data items in list 601, tool 702 returns to step 602. Otherwise, it proceeds with steps 606 through 610. Tool 702 gets 606 a node from QuadTree structure 605 and gets 607 data items in the node. It then creates 608 a data packet for the data items and puts 609 the data packet into Keyhole Flatfile database 703. If, in 610, there are more nodes in QuadTree structure 605, tool 702 returns to step 606. Otherwise the data migration process is complete.

Keyhole Flat File Database

The KFFDB 703 can come in two forms. One is a Keyhole Flatfile (KFF) and the other is a combination of a KFF and a set of Keyhole Binary Files (KBF).

There are three main parts to a KFF file:

Data 1000
BaseTree 1100
SubTree 1200

Figure 8:
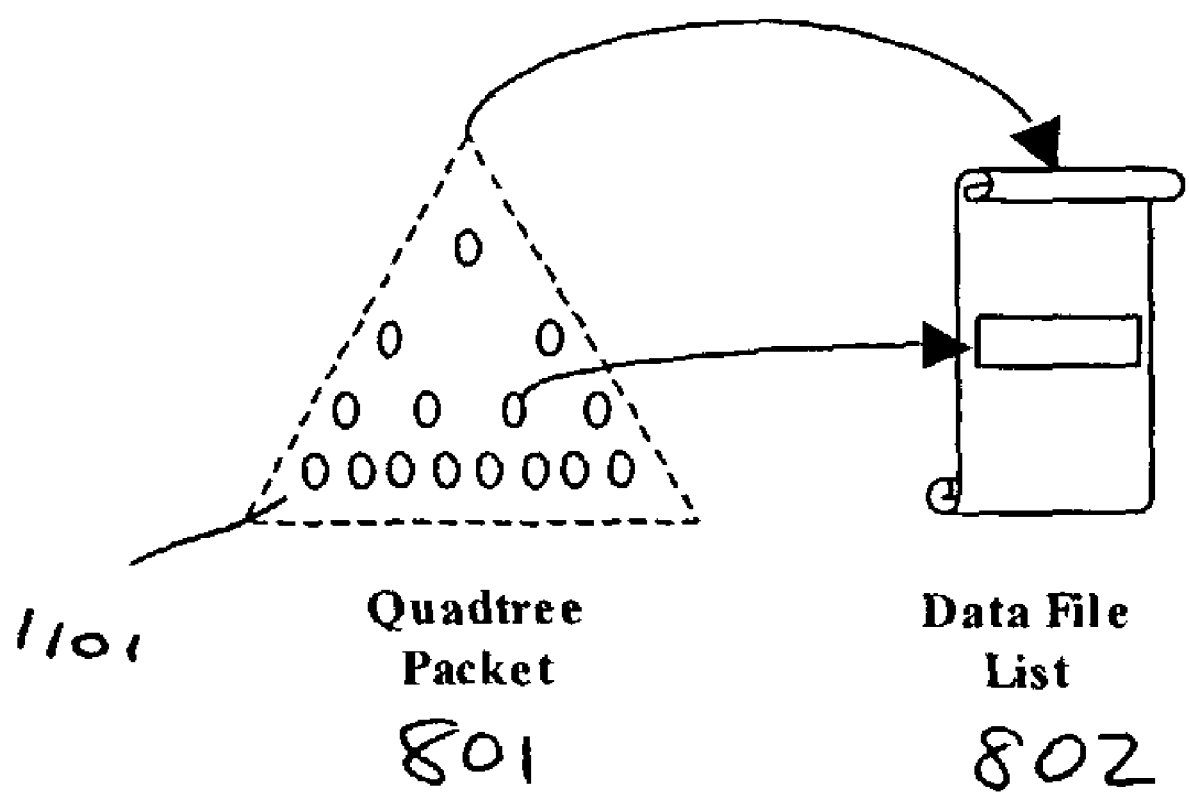
FIG. 8 is a diagram showing a QuadTree packet and data file list according to one embodiment of the present invention.
Figure 10:
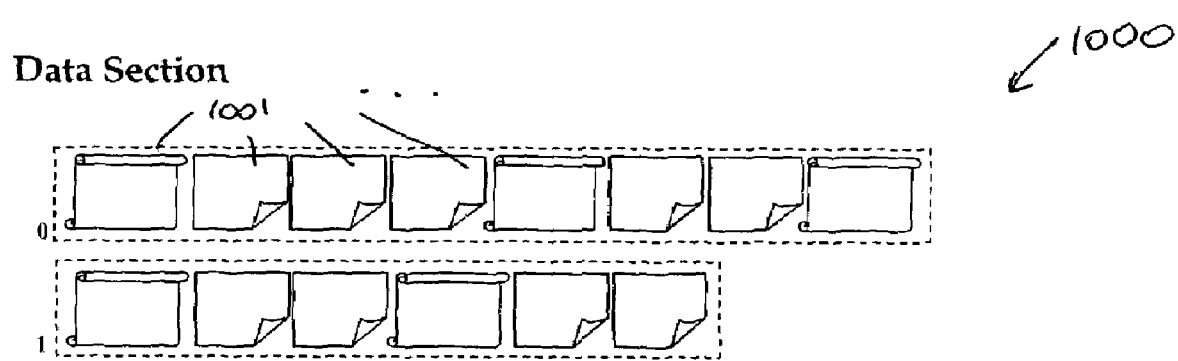
FIG. 10 is a diagram showing a data section according to one embodiment of the present invention.
Figure 11:
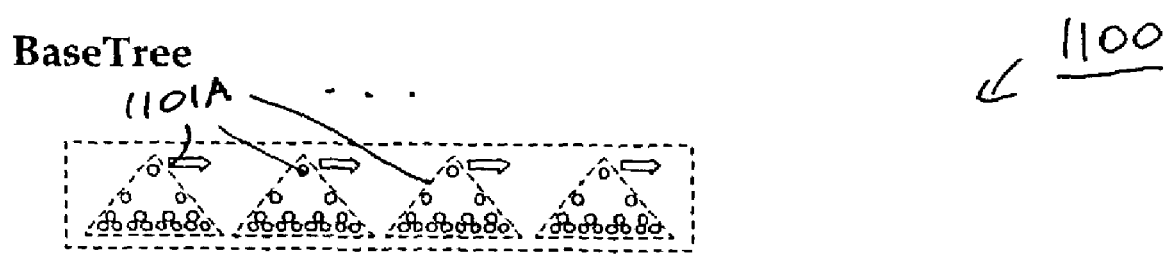
FIG. 11 is a diagram showing a basetree structure according to one embodiment of the present invention.
Figure 12:
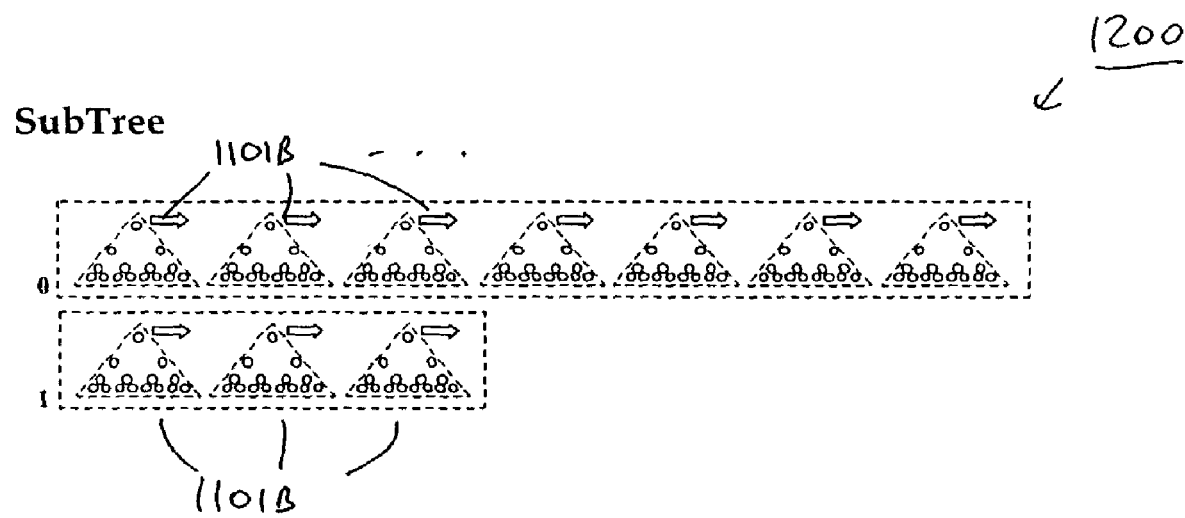
FIG. 12 is a diagram showing a subtree structure according to one embodiment of the present invention.

Referring now to FIG. 8, there is shown an example of a QuadTree packet 801 and data file list 802 according to one embodiment of the present invention. Referring also to FIGS. 10, 11, and 12, there are shown examples of structures for data section 1000, BaseTree 1100, and SubTree 1200 respectively. The data section 1000 contains the data files 1001 that are inserted into the KFF. The BaseTree 1100 contains all the nodes 1101A at the base of the tree, which are all nodes 1101A that reside on the first 12 levels. The SubTree contains all the nodes 1101B below the base of the tree. The nodes 1101 of the QuadTree packet 801 are stored in four-level packets; each packet has an associated list of data file names and locations. Each node 1101 indexes into that list to store the data file names and locations that are associated with that particular node 1101. The list of data file names and locations is stored in the data section 1000.

In one embodiment, the data section 1000 holds data files 1001 and QuadTreeFileLists, the BaseTree section 1100 holds QuadTreeIndexSections 1101A for the first 12 levels of the QuadTreeIndex, and the SubTree section 1200 holds QuadTreeIndexSections 1101B for the levels below level 12 of the QuadTreeIndex. Each section includes a set of files.

In the KFF, file space of deleted files is left unused. Therefore, over time with deletions and additions into the KFF, the data file can become fragmented. In the case of replaced files, the space is reused if the new file is less than or equal to the size of the old file. By storing QuadTree packet data file lists 802 in the data section, the invention allows base 1100 and SubTree 1200 sections to remain unfragmented, since QuadTree packets are atomic units (i.e., space for all 85 nodes are allocated when a QuadTree packet is created) while data file lists 802 can change in size.

Given the case where the data files 1001 are inserted into the KFF, the KFF can stand alone as a KFFDB 703 for the EarthServer DataStream.

The second form of the KFFDB 703 includes a KBF. In this case, the KFF is used as an index file into the KBF, which acts as the source for all of the data files. In one embodiment, the KBF file is used only with drawable packets (such as streets, polylines, sites, and the like), while the FF file format is used for imagery and terrain tiles. The KBF/KFF form of the KFFDB 703 may be used for maintaining large KFFDBs 703 such as the Earthserver ASP database, since it allows for small incremental updates to the database rather than a completely new KFFDB 703.

In one embodiment, KFFDB 703 is implemented using the following files. For a KFFDB 703 called "kffdb.sample", files might include:

kffdb.sample
kffdb.sample.1
kffdb.sample.2
kffdb.sample.base
kffdb.sample.sub
kffdb.sample.sub.1

The data section 1000 is the first three files (kffdb.sample, kffdb.sample.1, and kffdb.sample.2); the BaseTree section 1100 is in the fourth file (kffdb.sample.base), and the Sub-Tree section 1200 is in the last two files (kffdb.sample.sub and kffdb.sample.sub.1). In this embodiment, each section is split up into a series of files of predetermined size (such as one gigabyte, for example). Numbered file names such as kffdb.sample.1 and kffdb.sample.2 represent the split files. In this embodiment, the collection of these six files would be the KFF.

For the KBF/KFF form, in one embodiment the implementation would consist of the following files. For a KFFDB 703 called "kffdb.sample", files might include:

kffdb.sample
kffdb.sample.base
kffdb.sample.sub
kffdb.sample.sub1
restaurantdata.kbf
streetdata.kbf
imagerydata.ff The first four files (kffdb.sample, kffdb.sample.base, kffdb.sample.sub, and kffdb.sample.sub1) are the KFF that acts as the index into the last three files (restaurantdata.kbf, streetdata.kbf, and imagerydata.ff), which contain data such as streets, points, lines, imagery and terrain. The last three files do not require the .kbf/.ff extension.

EarthServer DataStream Server

In one embodiment, the EarthServer DataStream Server includes the following components:
KFFDB 703
dbRoot
Apache modules
  mod_flatfile
  mod_earthrender
  mod_dbrootmerger KFFDB 703 is the database that is to be delivered by the server. dbRoot maintains the version and content information of the KFFDB 703. The Apache modules deliver the contents of the KFFDB 703.

KFFDB 703

The EarthServer DataStream server can merge multiple KFFDBs 703 in addition to multiple remote databases. The local databases are directly attached and the remote databases are accessed via the mod_flatfile HTTP interface. In one embodiment, mod_flatfile allows ten local databases and ten remote databases to be merged, although in other embodiments additional databases may be merged. In one embodiment, EarthServer DataStream allows for one remote database to be merged—specifically, the Earthserver ASP. In alternative embodiments, any number of databases can be merged together. In one embodiment, the mod_earthrender module can only have one remote database and up to ten local databases; in other embodiments, this module can include any number of databases.

dbRoot

The dbRoot file contains the current version of the KFFDB 703. In one embodiment, dbRoot is the first thing that the Earthviewer 3D client asks for when it starts up so that it knows whether the data files it has in its cache are current or not. The dbRoot also contains information on what data is contained on each channel. It can potentially contain any other registry values that need to be set or changed in the Earthviewer 3D client, such as the domain name of the stream server, clip texture settings, and default values of buttons.

The dbRoot file also contains the encryption key that is used by the EarthServer DataStream Server to encrypt the content that is being delivered. The encryption key is also used by the client to decrypt the incoming data files.

In one embodiment, whenever the KFFDB 703 is changed on the server, the dbRoot version number must be incremented. If any additional channels of data have been added, in one embodiment they are recorded in the dbRoot file in order for the Earthviewer 3D client to be aware of their existence.

In one embodiment, the dbRoot file is created using the dbRoot tool. The channel information for a given KFFDB 703 is set by attaching a text file with the dbRoot. The text file in the ETA format takes the following form:

```
<etStruct> [export.layers]
{
    <etLayer> [Channel A]
    {
        "recreation"   0.0    128 true " "
    }
    <etLayer> [Channel B]
    {
        "building"   0.0    129 true " "
    {
    <etLayer> [Channel C]
    {
        "bang"   0.0    130 true " "
    }
}
```

For each entry in the list, the name of the channel is placed in the brackets [ ]. The first value in an entry is the type of icon to use in the "Show Me/Popular Locations" section of the Earthviewer 3D client. In one embodiment, the possible values for this are:
"american-flag"
"asian-flag"
"auto"
"auto-service"
"bang"
"bars"
"building"
"dining"
"fast-food"
"four-dollars"
"french-flag"
"italian-flag"
"mexican-flag"
"misc-dining"
"one-dollar"
"parks"
"recreation"
"three-dollars"
"transportation"
"two-dollars"

The second value is whether the channel is turned on (1.0) or off (0.0) by default. The third value is the channel number. The fourth value is whether the channel is to show up in the "Show Me/Popular Locations" list (true/false). The fifth value sets the channel to be triggered by a button on the Earthviewer 3D UI. The possible values are:
"borders"
"roads"
"terrain"
"weather"

Other values can also be set using the ETA file format.

mod_flatfile

This module delivers data files directly from the KFFDB 703 and generates QuadTree packets on demand for the KFFDB 703. This is the main interface for Earthviewer 3D and Earthviewer PocketPC. Files are accessed by asking for the QuadTree node location described by a branching traversal guide (BTG) and the name of the file. Data packets just use a BTG. The URI formats for requesting these data objects are as follows:
Data Files:
http://stream.earthviewer.com/flatfile?f1-<BTG>-<data-filename>
Example: http://stream.earthviewer.com/flatfile?f1-010302-i.1

Data File Name Formats:

| | |
|---|---|
| image tiles: | i.<version> |
| terrain tiles: | t.<version> |
| data files: | d.<channel>.<version> |

QuadTree Packets:

8-bit QuadTree Packets:

http://stream.earthviewer.com/flatfile?q1-<BTG>

16-bit QuadTree Packets:

http://stream.earthviewer.com/flatfile?q2-<BTG>

Example: http://stream.earthviewer.com/flatfile?q1-010302 mod_earthrender

This module delivers image files for viewing the KFFDB 703 through an HTML interface. The following are the parameters for defining a desired image:

| | |
|---|---|
| lat=[float] | Sets the latitude of the center pixel of the image. |
| long=[float] | Sets the longitude of the center pixel of the image. |
| level=[int] | Sets the level to access the database. |
| xsize=[int] | Sets the width of the image. |
| ysize=[int] | Sets the height of the image. |
| clist=[string] | Sets what channels to turn on in the image (i.e. turn on 1, 3, 34 then string is 001003034) |
| plat=[float] | Sets the latitude of the annotation point. |
| plong=[float] | Sets the longitude of the annotatin point. |
| pname=[string] | Sets the label of the annotation point. |
| ypsearch=[string] | Sets the string to search for in the yp database. |
| filetype=[string] | Sets what type of file to return.<br>jpeg = "jpg"<br>gif = "gif"<br>eta = "eta" |
| textnum=[int] | If value is 1 then sends over comma-delineated list of visible sites/POIs in the image. | mod_dbrootmerger

This module delivers the dbRoot file. It also merges the dbRoot file with the dbRoot file of remote KFFDBs 703 so that when changes are made to remote KFFDBs 703 it is reflected as a change in the delivered database from the EarthServer DataStream Server. The delivered version number is computed by adding all of the version numbers of each dbRoot together, therefore if any of the dbRoots get upreved then the merged dbRoot gets upreved. It also can merge the channel content information from other remote KFFDBs 703, if desired.

Session Key Verification and Access Control Layer Restrictions

The EarthServer DataStream works in conjunction with an authorization server that passes out session keys to registered users. The session keys are needed for two reasons: to validate the user and to restrict access to the database.

The validation is done both at the authorization server and the stream server. The authorization server only gives out session keys to registered users. These session keys have an expiration time that is checked by the stream servers, so old session keys can not be stolen and reused.

The session keys also contain additional information that tells the stream server which parts of the database a particular user is allowed to access. This is conveyed through the use of package IDs, where each package ID grants database access for a particular region, at a particular resolution, and for a particular channel (i.e. imagery, terrain, roads, restaurants, etc.).

System

In one embodiment, the present invention runs on a conventional computer, having components such as the following:

1×866 MHz Pentium III

512 MB Main Memory

18 GB Hard Disk Space

In another embodiment, the present invention runs on a conventional computer, having components such as the following:

2×1 GHz Pentium III

1 GB Main Memory

36 GB Hard Disk Space

In yet another embodiment, the present invention runs on a conventional computer, having components such as the following:

2×1.26 GHz Pentium III

2 GB Main Memory

72 GB Hard Disk Space

One skilled in the art will recognize that many other types of hardware components may be used in connection with the present invention. Component characteristics may affect the performance of EarthServer DataStream (ESDS) as follows.

CPU: The processor speed mainly affects how fast ESDS can deliver earthrender images. A faster processor will allow for more images to be delivered per second. The main processor-heavy elements of mod_flatfile are encryption, compression, and QuadTree packet generation.

Memory: The amount of main memory helps tremendously in system caching of file blocks. This increases the speed at which data packets can be pulled out of the KFFDB 703 and therefore general performance of ESDS.

Hard Drive: The more disk space that is available, the more of the KFFDB 703 that can be cached on the local disk, and the fewer requests need to be made to the remote server (i.e. Earthserver ASP). In the case of an NFS-mounted NAS device, it could reduce need to access the NAS device by caching previously requested locally. Also for earthrender, the local drive can be used to cache decompressed image tiles, which can tremendously increase performance. The main factor that affects KFFDB 703 read performance is disk seek time, and disk seek time is directly related to rotational speed. Therefore higher rotational speed generally results in improved performance.

Module Directives

The following is a list of directives for each module. The directives with the * next to them are required directives and the others are optional. There is an explanation of each directive below along with an example of how to use them.

mod_flatfile

*KffFlatfileDatabasePath—a list of kff database paths

Example:

KffFlatfileDatabasePath /gaiadb/db1/kffdb.db1/gaiadb/db2/kffdb.db2

KffFlatfileDatabaseURL—a list of kff database URLs

Example:

KffFlatfileDatabaseURL stream.earthviewer.com stream.companyA.com

*KffDatabaseRootPath—the path for the dbRoot file

Example:

KffDatabaseRootPath /var/www/dbroot/dbRoot.ver1

KffFlatfileLogFilePath—the path for flat file log

Example:

KffFlatfileLogFilePath /var/www/logs/kffdblog

KffFlatfileSessionCheckLevel—the session check level (0—only valid cookie, 1—valid cookie or no cookie, 2—no restrictions)
Example:
KffFlatfileSessionCheckLevel 2
KffFlatfileBinaryLog—flag for using binary log
Example:
KffFlatfileBinaryLog On
KffFlatfileBinaryLog Off
KffFlatfileCacheFilePath—the path for cache file
Example:
KffFlatfileCacheFilePath /var/www/esds-cache/
KffFlatfileMaximumCacheSize—the maximum number of MB of the cache file
Example:
KffFlatfileMaximumCacheSize 1000
KffFlatfileACLDictionaryPath—the path for the ACL dictionary
Example:
KffFlatfileACLDictionaryPath
/var/www/acl/ACL_dict1
KffFlatfileACLIndexPath—the path for the ACL index
Example:
KffFlatfileACLIndexPath /var/www/acl/ACL_index_1
KffFlatfileACLDefaultPolicyPath—the path for the ACL default policy
Example:
KffFlatfileACLDefaultPolicyPath
/var/www/acl/ACL_def1
KffFlatfileACLMemoryResident—flag for whether the dictionary is memory resident or not
Example:
KffFlatfileACLMemoryResident On
KffFlatfileACLMemoryResident Off
KffFlatfileCopyrightListPath—the path for the copyright list file
Example:
KffFlatfileCopyrightListPath
/var/www/crlist/copyrightlist.crf
mod_earthrender
*KffEarthrenderDatabasePath—a list of kff database paths
Example:
KffEarthrenderDatabasePath /gaiadb/db1/kffdb.db1/gaiadb/db2/kffdb.db2
KffEarthrenderDatabaseURL—a list of kff database URLs
Example:
KffEarthrenderDatabaseURL stream.earthviewer.com
*KffTexturePath—the path for the texture image files
Example:
KffTexturePath /var/www/textures/
KffYPServerUrlPath—the url for the ypserver
Example:
KffYPServerUrlPath http://yp.earthviewer.com/cgi-bin/ypsearch_beta?long=% 1f&lat=% 1f&dlat=% 1f&dlong=% 1f&name=% s
KffEarthrenderCheckLevel—the check level for access
(0—full access, 1—SF only, 2—ACL/SessionKey restricted access)
Example:
KffEarthrenderCheckLevel 2
KffEarthrenderACLDictionaryPath—the path for the ACL dictionary
Example:
KffEarthrenderACLDictionaryPath
/var/www/acl/ACL_dict1
KffEarthrenderACLIndexPath—the path for the ACL index
Example:
KffEarthrenderACLIndexPath
/var/www/acl/ACL_index_1
KffEarthrenderACLDefaultPolicyPath—the path for the ACL default policy
Example:
KffEarthrenderACLDefaultPolicyPath
/var/www/acl/ACL_def1
KffEarthrenderACLMemoryResident—flag for whether the dictionary is memory resident or not
Example:
KffEarthrenderACLMemoryResident On
KffEarthrenderACLMemoryResident Off
KffEarthrenderCopyrightListPath—the path for the copyright list file
Example:
KffEarthrenderCopyrightListPath
/var/www/crlist/copyrightlist.crf
mod_dbrootmerger
KffDbRootMergerURL—a list of kff database URLs
Example:
KffDbRootMergerURL stream.earthviewer.com
*KffDbRootMergerDbRootPath—the path for the dbRoot file
Example:
KffDbRootMergerDbRootPath
/var/www/dbroot/dbRoot.ver1
KffDbRootMergerPostambleMerge—flag for whether to merge the postambles
Example:
KffDbRootMergerPostambleMerge On
KffDbRootMergerPostambleMerge Off
Tools
smelter—This tool is used to convert customer data into kbf or kff files. It is the main tool used for data migration, as shown in FIG. 6.
dbroottool—This tool is used to create the dbRoot file. It can read the contents of a dbRoot file, write out a new dbRoot file, or increment the version number of a dbRoot file.
kbftokff—This tool is used to add a kbf file into a kff file. This mainly pertains to drawables such as points and lines.
fftokff—This tool is used to add an ff file into a kff file. This mainly pertains to imagery and terrain.
kffperf—This is a tool to measure the performance of the EarthServer DataStream. It takes a log file form the apache server and sends those requests to a given server.
kffview—This tool is used to view the contents of a kff file, just like traversing through directories on a unix file system.
kffreadlog—This tool is used to read the binary log file generated by the mod_flatfile module.
Libraries
kff—This library is used to create and modify kff files.
kbf—This is a header file that provides classes to create, read, and write kbf files.
qtpgen—This library is used to create/modify drawable packets and QuadTree packets.

jpegbuffer—This library is used to create 2D representations (such as JPEG images) from the KFFDB 703 database.

Methods

Referring now to FIGS. 1 through 6, there are shown flow charts of various methods according to the present invention. The following components, associated with KFF, are used in the various methods as depicted in FIGS. 1 through 6. Referring also to FIG. 1A, there is shown a legend indicating symbols for the various components described below.

Data Packet

Summary: This is a collection of bytes that contain data about a geospecific area of the earth. This data can be of any type: imagery, terrain, vectors, points, etc.

QuadTreeIndexNode

Summary: This is one node of the QuadTreeIndex. The node contains two numbers, offset and length, which refers to a particular section of the QuadTreeFileList of the QuadTreeIndexSection associated with the node. This section contains the list of data packets that are associated with the node, where each item in the list tells the name of the data packet, the location of the data packet, and the size of the data packet.

QuadTreeFilePosition

Summary: This data item contains two numbers, data file index and data file offset, which are used to store the location of a particular data packet. The data file index tells which file it is contained in, and the data file offset tells where in that file the data packet is located.

QuadTreePosition

Summary: This data item contains a particular position of a node in the QuadTree by specifying the level of the node and a list of what child was traversed at each level.

QuadTreeFileEntry

Summary: This data item contains three things: name string, QuadTreePosition, and data packet size. These describe the name of the data packet, the location of the data packet, and the size of the data packet.

QuadTreeFileList

Summary: This data item is a set of QuadTreeFileEntries. It is associated with a QuadTreeIndexSection and it is the list of all the data packets that are contained within that particular QuadTreeIndexSection.

QuadTreeIndexSection

Summary: This data item is a four-level section of the QuadTreeIndex consisting of QuadTreeIndexNodes and an associated QuadTreeFileList. It also contains QuadTreePositions for all the children of the fourth-level nodes.

QuadTreeIndex

Figure 9:
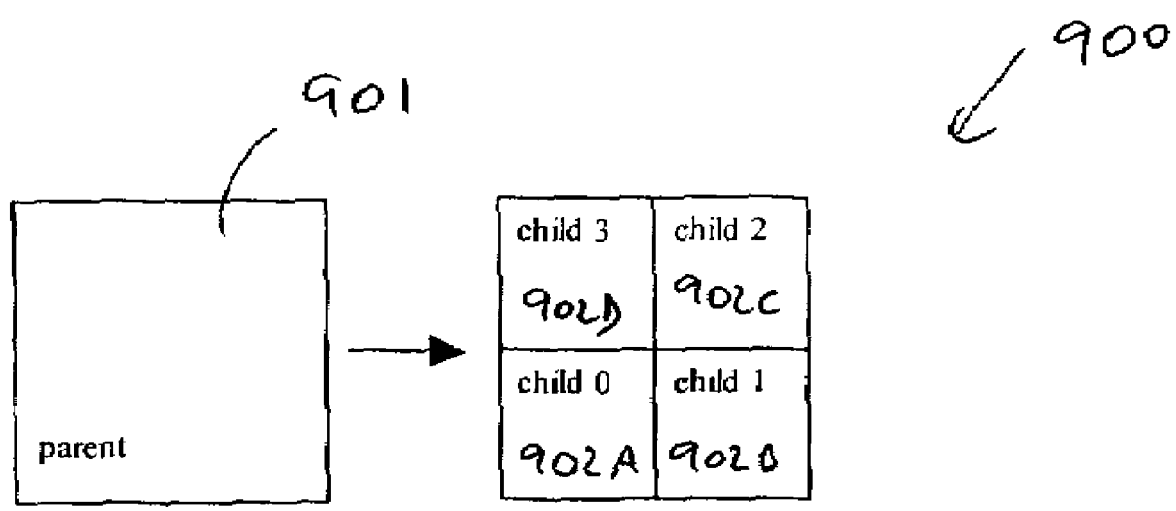
FIG. 9 is a diagram showing a QuadTree-based approach to spatially organize data according to one embodiment of the present invention.

Summary: Referring now to FIG. 9, there is shown the QuadTreeIndex indexing system to the KFF file that tells what is in the database and where in the database it resides. It uses a QuadTree-based approach to spatially organize the data. This means each node of the QuadTree has four children 902A–C, where each child 902 covers one quarter of its parent's 901 defined area.

QuadTreeQuantum

Summary: This data item contains information about a particular node in the QuadTree that is delivered to the Earthviewer 3D client. This QuadTree is different from the QuadTreeIndex; the information in the node is specific to the Earthviewer 3D client. The node contains version numbers for imagery, terrain, cache node, and channels. It also contains children existence information.

QuadTreePacket

Summary: This data item includes a recursively ordered list of QuadTreeQuantums, which describes a section of the Earthviewer 3D client QuadTree.

KFF Data Retrieval

Figure 1:
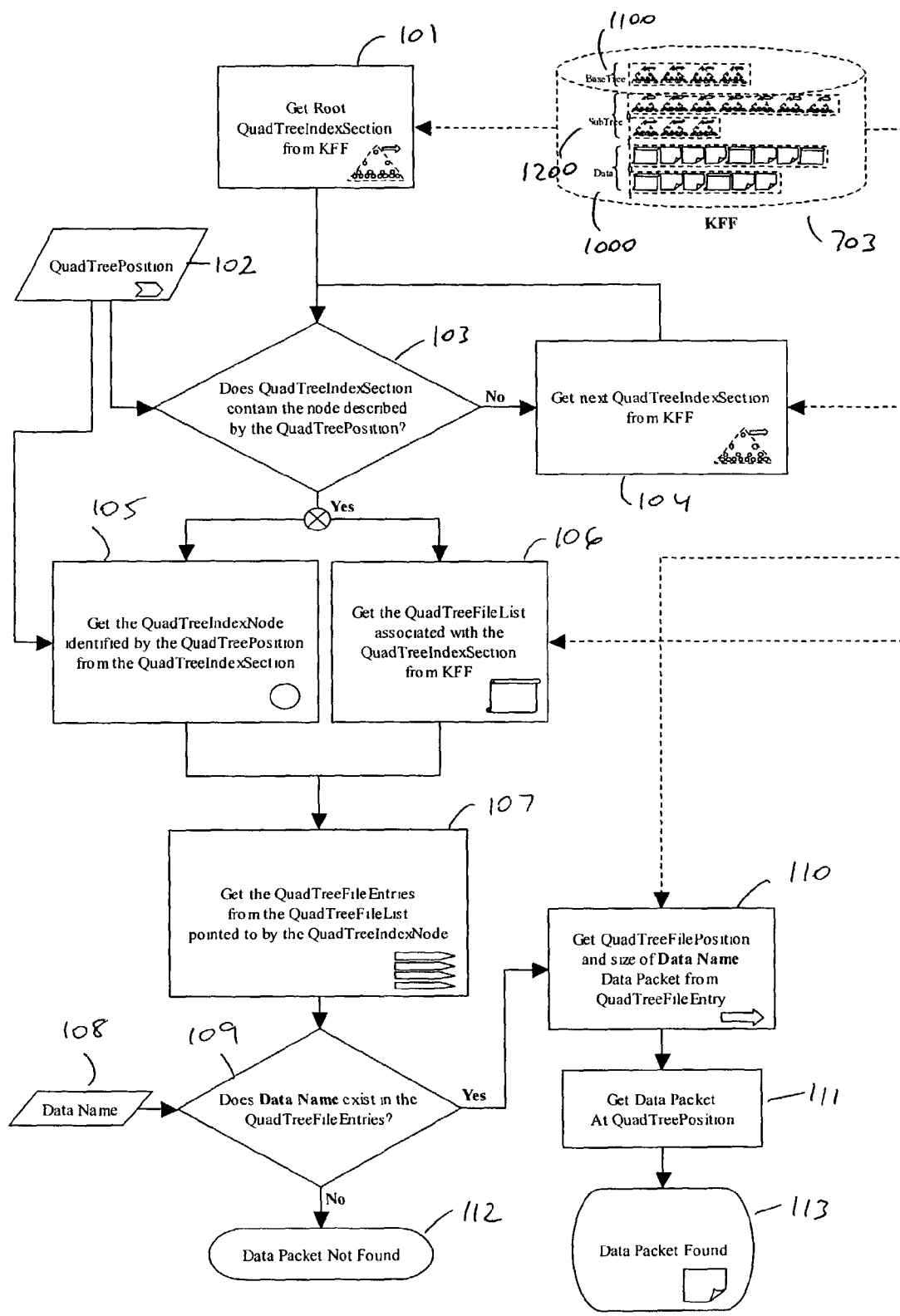
FIG. 1 is a flow chart of KFF data retrieval according to one embodiment of the present invention.
Figure 1A:
FIG. 1A is a legend for various Figures of the present application.
Figure 1A:
Figure 1A:
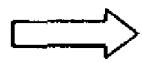
Figure 1A:
Figure 1A:
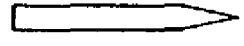
Figure 1A:
Figure 1A:
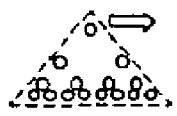
Figure 1A:
Figure 1A:
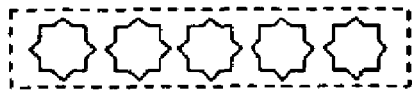

FIG. 1 is a flow chart of KFF data retrieval according to one embodiment of the present invention. The system gets 101 root QuadTreeIndexSection from KFF 703 and determines 103 whether QuadTreeIndexSection contains the node described by QuadTreePosition 102. If not, the system gets 104 the next QuadTreeIndexSection from KFF 703. If QuadTreeIndexSection does contain the node, the system gets 105 the QuadTreeIndexNode identified by the QuadTreePosition from the QuadTreeIndexSection, and gets 106 the QuadTreeFileList associated with the QuadTreeIndexSection from KFF 703. Then, the system gets 107 the QuadTreeFileEntries from the QuadTreeFileList pointed to by the QuadTreeIndexNode and determines 109 whether Data Name 108 exists in the QuadTreeFileEntries.

If Data Name 108 does not exist in the QuadTreeFileEntries, the system returns 112 a returns 113 a "Data Packet Not Found." If Data Name 108 does exist in the QuadTreeFileEntries, the system gets 110 QuadTreeFilePosition and size of Data Name 108 Data Packet from QuadTreeFileEntry. The system then gets 111 Data Packet at QuadTreePosition, and returns 113 a "Data Packet Found."

QuadTree Packet Generation

Figure 2:
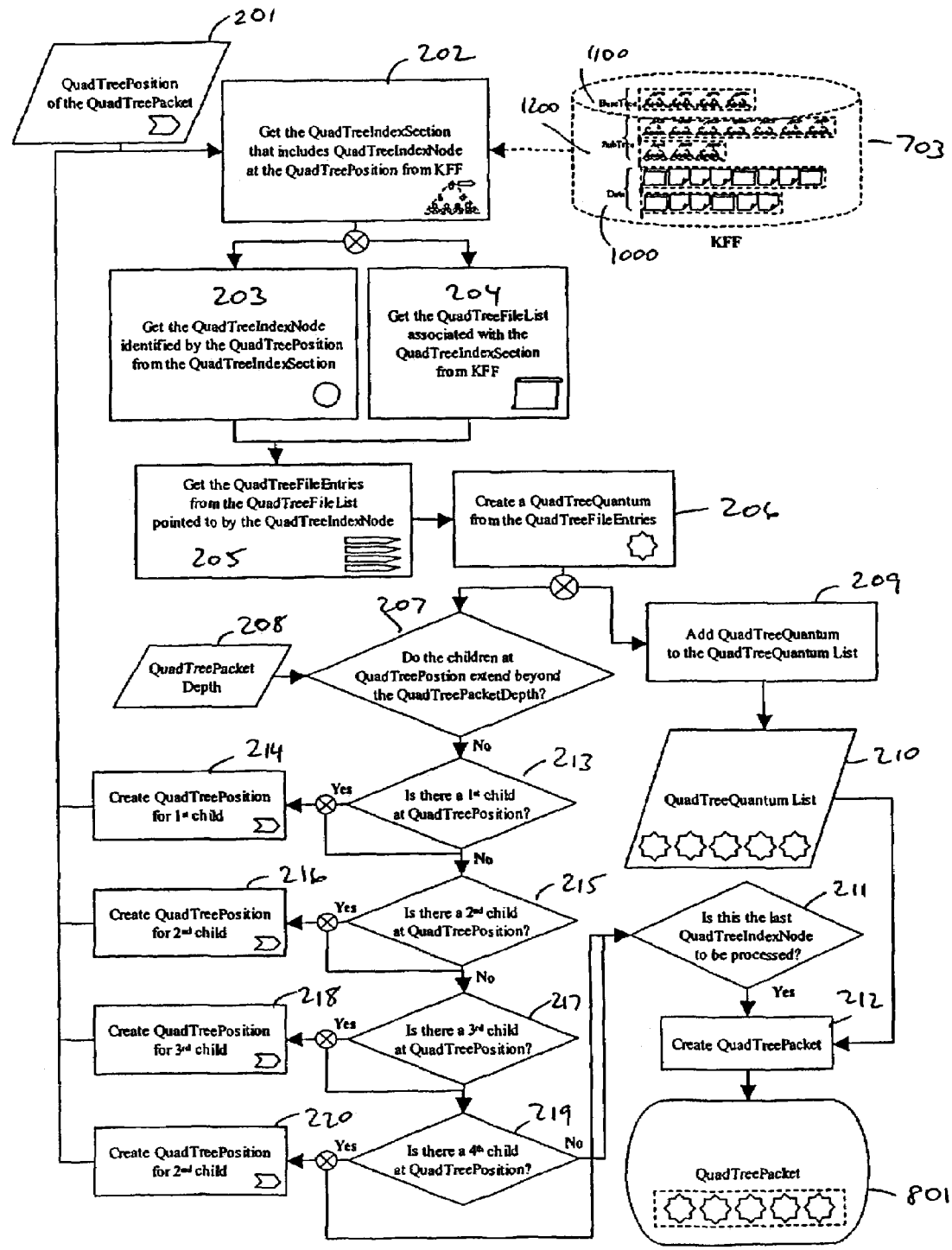
FIG. 2 is a flow chart of QuadTree packet generation according to one embodiment of the present invention.

FIG. 2 is a flow chart of QuadTree packet generation according to one embodiment of the present invention. The system gets 202 the QuadTreeIndexSection that includes the QuadTreeIndexNode at the QuadTreePosition 201 from KFF 703. The system then gets 203 the QuadTreeIndexNode identified by the QuadTreePosition 201 from the QuadTreeIndexSection, and gets 204 the QuadTreeFileList associated with the QuadTreeIndexSection from KFF 703. The system then gets 205 the QuadTreeFileEntries from the QuadTreeFileList pointed to by the QuadTreeIndexNode, and creates 206 a QuadTreeQuantum from the QuadTreeFileEntries.

The system then adds 209 the QuadTreeQuantum to the QuadTreeQuantum list 210. Also, it determines 207 whether the children at the QuadTreePosition 201 extend beyond the QuadTreePacketDepth 208. If not, the system determines 213 whether there is a first child at the QuadTreePosition 201; if so, it creates 214 a QuadTreePosition for the first child. The system determines 215 whether there is a second child at the QuadTreePosition 201; if so, it creates 216 a QuadTreePosition for the second child. The system determines 217 whether there is a third child at the QuadTreePosition 201; if so, it creates 218 a QuadTreePosition for the third child. The system determines 219 whether there is a fourth child at the QuadTreePosition 201; if so, it creates 220 a QuadTreePosition for the fourth child.

The system then determines 211 whether this is the last QuadTreeIndexNode to be processed. If so, it creates 212 the QuadTreePacket 801 from the QuadTreeQuantum list 210.

QuadTree Packet Merging

Figure 3:
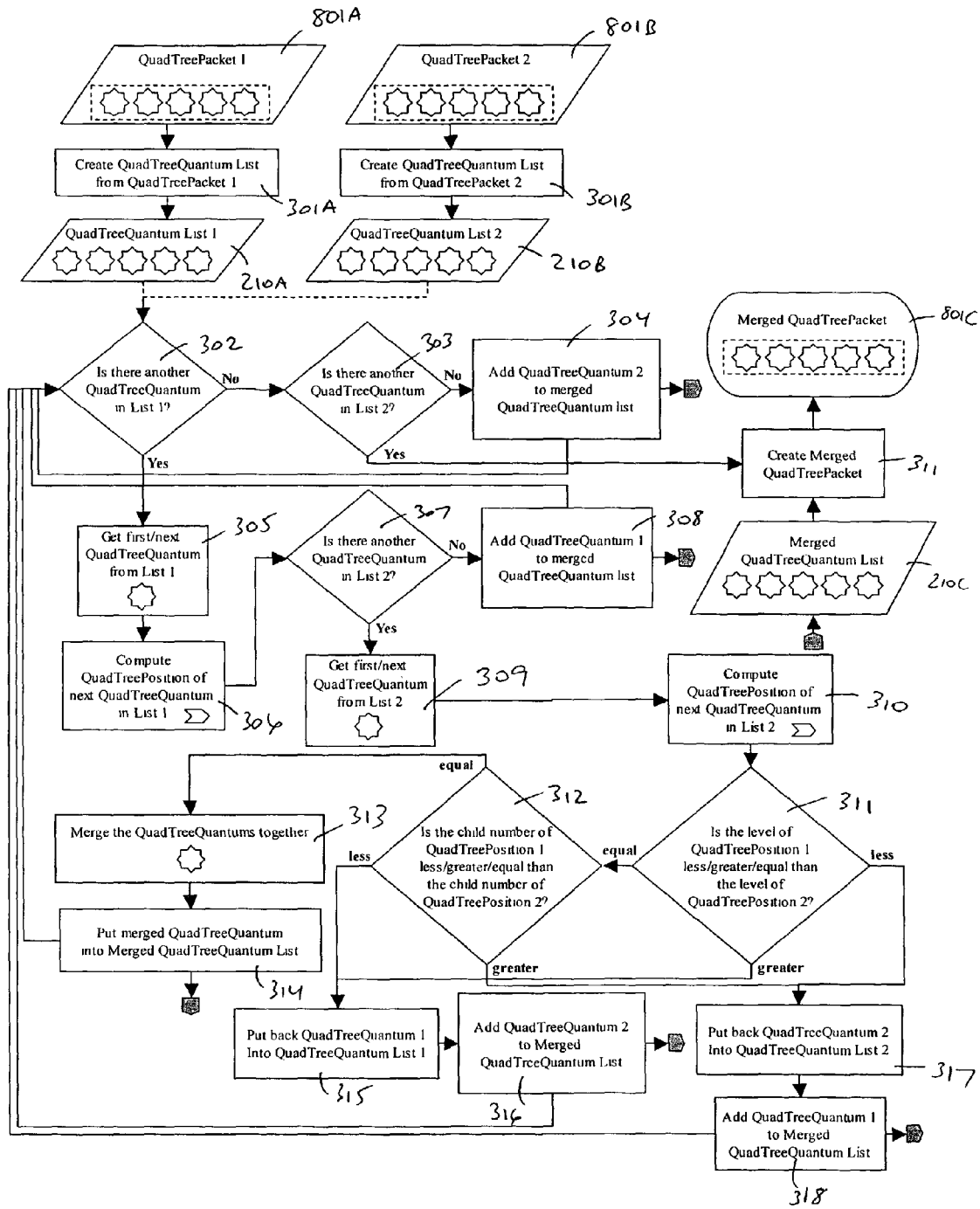
FIG. 3 is a flow chart of QuadTree packet merging according to one embodiment of the present invention.

FIG. 3 is a flow chart of QuadTree packet merging according to one embodiment of the present invention. The system merges QuadTreePacket1 801A and QuadTreePacket2 801B as follows. It creates 301A QuadTreeQuantumList1 210A from QuadTreePacket1 801A, and creates 301B QuadTreeQuantumList2 210B from QuadTreePacket2 801B. The system then determines 302 whether there is another QuadTreeQuantum in List1 210A. If not, the system determines 303 whether there is another QuadTreeQuantum in List2 210B. If not, the system adds 304 QuadTreeQuantum2 to the merged QuadTreeQuantumList 210C and creates 311 a merged QuadTreePacket 801C.

If, in 303, the system determines that there is another QuadTreeQuantum in List2 210B, it proceeds directly to step 311 to create a merged QuadTreePacket 801C.

If, in 302, the system determines that there is another QuadTreeQuantum in List1 210A, it gets 305 the first or next QuadTreeQuantum from List1 210A, computes 306 the QuadTreePosition of the next QuadTreeQuantum in List1 210A, and determines 307 whether there is another QuadTreeQuantum in List2 210B. If not, the system adds 308 QuadTreeQuantum1 to the merged QuadTreeQuantumList 210C and creates 311 a merged QuadTreePacket 801C.

If, in 307, the system determines that there is another QuadTreeQuantum in List2 210B, it gets 309 the first or next QuadTreeQuantum from List2 210B and computes 310 the QuadTreePosition of the next QuadTreeQuantum in List2 210B. Then, it determines 311 whether the level of QuadTreePosition1 is less than, greater than, or equal to the level of QuadTreePosition2. If the level of QuadTreePosition1 is less than the level of QuadTreePosition2, the system puts back 317 QuadTreeQuantum2 into QuadTreeQuantumList2 210B, adds 318 QuadTreeQuantum1 to the merged QuadTreeQuantumList 210C and creates 311 a merged QuadTreePacket 801C.

If, in 311, the system determines that the level of QuadTreePosition1 is greater than the level of QuadTreePosition2, it puts back 315 QuadTreeQuantum1 into Quad TreeQuantumList1 210A, adds 316 QuadTreeQuantum2 to the merged QuadTreeQuantumList 210C and creates 311 a merged QuadTreePacket 801C. It also returns to step 302.

If, in 311, the system determines that the level of QuadTreePosition1 is equal to the level of QuadTreePosition2, it determines 312 whether the child number of QuadTreePosition1 is less than, greater than, or equal to the child number of QuadTreePosition2. If the child number of QuadTreePosition1 is less than the child number of QuadTreePosition2, the system puts back 315 QuadTreeQuantum1 into QuadTreeQuantumList1 210A, adds 316 QuadTreeQuantum2 to the merged QuadTreeQuantumList 210C and creates 311 a merged QuadTreePacket 801C. It also returns to step 302. If, in 312, the child number of QuadTreePosition1 is greater than the child number of QuadTreePosition2, the system puts back 317 Quad TreeQuantum2 into QuadTreeQuantumList2 210B, adds 318 QuadTreeQuantum1 to the merged QuadTreeQuantumList 210C and creates 311 a merged QuadTreePacket 801C. If, in 312, the child number of QuadTreePosition1 is equal to the child number of QuadTreePosition2, the system merges 303 the QuadTreeQuantums together, puts 314 the merged QuadTreeQuantum into the merged QuadTreeQuantumList 210C, and creates 311 a merged QuadTreePacket 801C. It also returns to step 302.

Obtaining a Session Key

Figure 4:
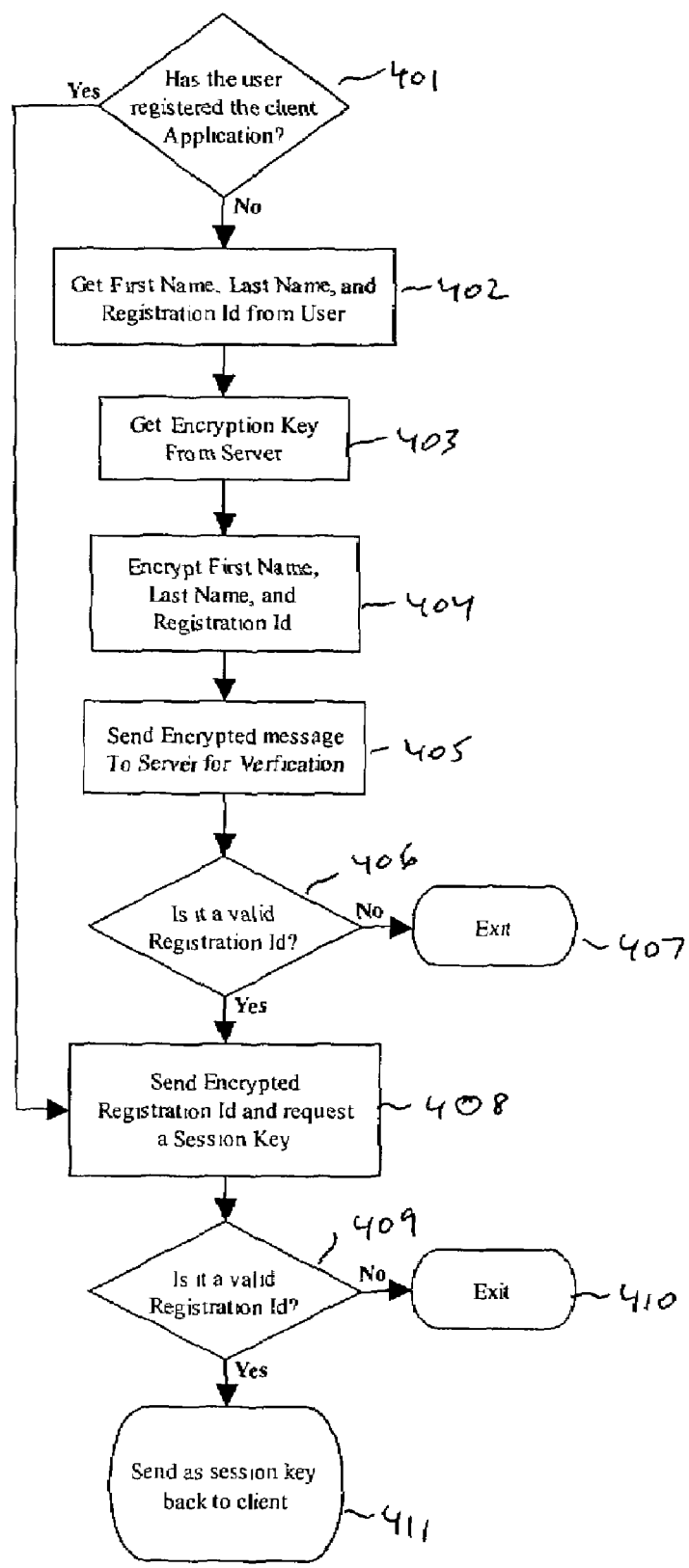
FIG. 4 is a flow chart of obtaining a session key according to one embodiment of the present invention.

FIG. 4 is a flow chart of obtaining a session key according to one embodiment of the present invention. The system determines 401 whether the user has registered the client application. If not, it gets 402 the first name, last name, and registration ID from the user. Next, the system gets 403 the encryption key from the server. Next, it encrypts 404 the first name, last name, and registration ID, and sends 405 the encrypted message to the server for verification. If the server indicates 406 that the registration ID is not valid, the system exits 407.

If, in 406, the server indicates that the registration ID is valid, or if, in 401, the system determines that the user has registered the client application, the system sends 408 the encrypted registration ID and requests a session key.

The system then determines 409 whether the registration ID is valid. If so, it sends 411 a session key back to the client. If not, the system exits 410.

Using a Session Key

Figure 5:
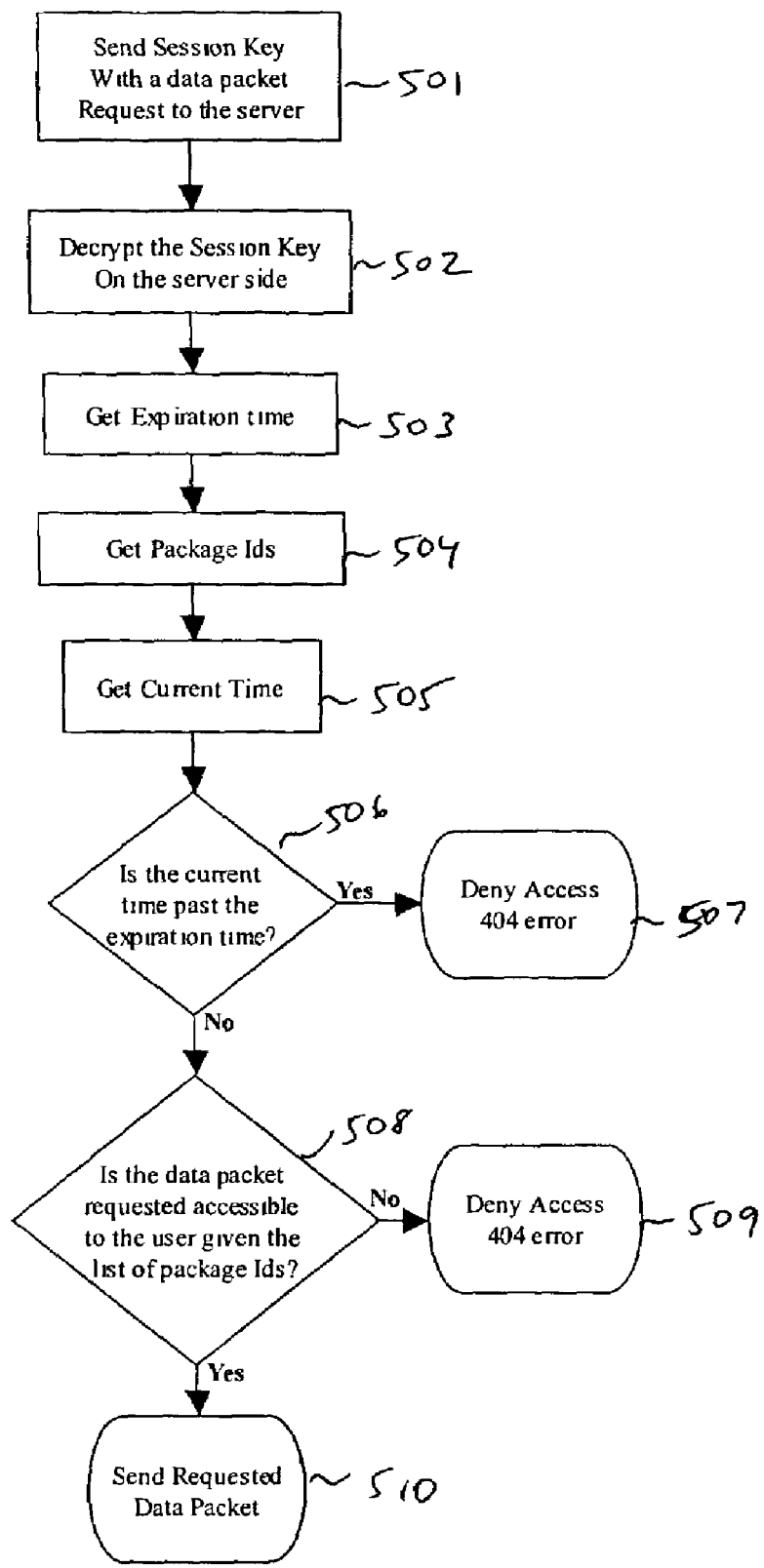
FIG. 5 is a flow chart of using a session key with a data packet according to one embodiment of the present invention.

FIG. 5 is a flow chart of using a session key with a data packet according to one embodiment of the present invention. The system sends 501 the session key with a data packet request to the server. Next, it decrypts 502 the session key on the server side, and gets expiration time 502, package IDs 503, and current time 505. The system then determines 506 whether the current time is past the expiration time. If so, it denies 507 access.

If the current time is not past the expiration time, the system determines 508 whether the data packet requested is accessible to the user given the list of package IDs. If not, it denies 509 access. If the data packet is accessible, the system sends 510 the requested data packet.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method of merging a first packet of geospatial data with a second packet of geospatial data, comprising:
    a) creating a first list of node descriptors from the first packet of geospatial data;
    b) creating a second list of node descriptors from the second packet of geospatial data;
    c) if at least one node descriptor remains in the first list:
        c.1) obtaining a next node descriptor in the first list;
        c.2) determining a first position associated with the node descriptor in the first list, the first position having a first level;
    d) if at least one node descriptor remains in the first list and at least one node descriptor remains in the second list:
        d.1) obtaining the next node descriptor in the second list;
        d.2) determining a second position associated with the node descriptor in the second list, the second position having a second level;
        d.3) if the first level is less than the second level, adding the node descriptor in the first list to a merged list of node descriptors; and
        d.4) if the first level is greater than the second level, adding the node descriptor in the second list to the merged list of node descriptors;
    e) if at least one node descriptor remains in the first list and no node descriptors remain in the second list:
        e.1) adding the node descriptor in the first list to the merged list of node descriptors;
    f) if no node descriptors remain in the first list and at least one node descriptor remains in the second list:
        f.1) adding the node descriptor in the second list to the merged list of node descriptors; and
    g) creating a merged packet from the merged list.

2. The method of claim 1, wherein step d) further comprises:
    d.5) if the first level is equal to the second level:
        d.5.1) determining a first child number of the first position and a second child number of the second position;
        d.5.2) if the first child number is less than the second child number, adding the node descriptor in the second list to the merged list of node descriptors;
        d.5.3) if the first child number is greater than the second child number, adding the node descriptor in the first list to the merged list of node descriptors; and
        d.5.4) if the first child number is equal to the second child number, merging the node descriptor in the first list with the node descriptor in the second list and adding the merged node descriptor to the merged list of node descriptors.

3. A computer program product for merging a first packet of geospatial data with a second packet of geospatial data, comprising:
    a computer-readable medium; and
    computer program code, encoded on the medium, for:
        a) creating a first list of node descriptors from the first packet of geospatial data;
        b) creating a second list of node descriptors from the second packet of geospatial data;
        c) if at least one node descriptor remains in the first list:
            c.1) obtaining a next node descriptor in the first list;
            c.2) determining a first position associated with the node descriptor in the first list, the first position having a first level;
        d) if at least one node descriptor remains in the first list and at least one node descriptor remains in the second list:
            d.1) obtaining the next node descriptor in the second list;
            d.2) determining a second position associated with the node descriptor in the second list, the second position having a second level;
            d.3) if the first level is less than the second level, adding the node descriptor in the first list to a merged list of node descriptors; and
            d.4) if the first level is greater than the second level, adding the node descriptor in the second list to the merged list of node descriptors;
        e) if at least one node descriptor remains in the first list and no node descriptors remain in the second list:
            e.1) adding the node descriptor in the first list to the merged list of node descriptors;
        f) if no node descriptors remain in the first list and at least one node descriptor remains in the second list:
            f.1) adding the node descriptor in the second list to the merged list of node descriptors; and
        g) creating a merged packet from the merged list.

4. The computer program product of claim 3, wherein the computer program code for performing step d) further comprises computer program code for:
- d.5) if the first level is equal to the second level:
  - d.5.1) determining a first child number of the first position and a second child number of the second position;
  - d.5.2) if the first child number is less than the second child number, adding the node descriptor in the second list to the merged list of node descriptors;
  - d.5.3) if the first child number is greater than the second child number, adding the node descriptor in the first list to the merged list of node descriptors; and
  - d.5.4) if the first child number is equal to the second child number, merging the node descriptor in the first list with the node descriptor in the second list and adding the merged node descriptor to the merged list of node descriptors.

5. A system for merging a first packet of geospatial data with a second packet of geospatial data, comprising:
- a node descriptor list module, for creating a first list of node descriptors from the first packet of geospatial data and for creating a second list of node descriptors from the second packet of geospatial data;
- a merge module, coupled to the node descriptor list module, for, if at least one node descriptor remains in the first list:
  - obtaining a next node descriptor in the first list;
  - determining a first position associated with the node descriptor in the first list, the first position having a first level;
  - if at least one node descriptor remains in the first list and at least one node descriptor remains in the second list:
    - obtaining the next node descriptor in the second list;
    - determining a second position associated with the node descriptor in the second list, the second position having a second level;
    - if the first level is less than the second level, adding the node descriptor in the first list to a merged list of node descriptors; and
    - if the first level is greater than the second level, adding the node descriptor in the second list to the merged list of node descriptors;
  - if at least one node descriptor remains in the first list and no node descriptors remain in the second list:
    - adding the node descriptor in the first list to the merged list of node descriptors;
  - if no node descriptors remain in the first list and at least one node descriptor remains in the second list:
    - adding the node descriptor in the second list to the merged list of node descriptors; and
  - creating a merged packet from the merged list.

6. The system of claim 5, wherein if the first level is equal to the second level, the merge module performs the steps of:
- determining a first child number of the first position and a second child number of the second position;
- if the first child number is less than the second child number, adding the node descriptor in the second list to the merged list of node descriptors;
- if the first child number is greater than the second child number, adding the node descriptor in the first list to the merged list of node descriptors; and
- if the first child number is equal to the second child number, merging the node descriptor in the first list with the node descriptor in the second list and adding the merged node descriptor to the merged list of node descriptors.

* * * * *